US005809411A

United States Patent [19]

Kudoh et al.

[11] Patent Number: 5,809,411

[45] Date of Patent: Sep. 15, 1998

[54] RADIO PAGER HOUSING HAVING OPENINGS FOR REPLACING A CRYSTAL OSCILLATOR

[75] Inventors: Kazuhiro Kudoh; Tetsumi Ishiguro, both of Tokyo, Japan

[73] Assignee: NEC Corporation, Tokyo, Japan

[21] Appl. No.: 488,617

[22] Filed: Jun. 7, 1995

Related U.S. Application Data

[63] Continuation of Ser. No. 536,839, Feb. 19, 1992, abandoned.

[30] Foreign Application Priority Data

Feb. 19, 1991 [JP] Japan .................................... 3-045929
Feb. 25, 1991 [JP] Japan .................................... 3-050248

[51] Int. Cl.$^{6}$ ...................................................... H04B 1/08
[52] U.S. Cl. .......................... 455/348; 455/319; 455/351
[58] Field of Search ................................ 455/62, 89, 90, 455/193.1, 193.2, 193.3, 228, 318, 319, 320, 348, 351, 347, 575; 340/825.44

[56] References Cited

U.S. PATENT DOCUMENTS 4,000,470 12/1976 Okada ................................. 455/180.2
4,012,672 3/1977 Douglass et al. .
4,089,044 5/1978 Gatto et al. ......................... 455/348 X
4,131,851 12/1978 Martiny et al. .
4,201,960 5/1980 Skutta et al. ............................ 455/123
4,283,796 8/1981 Hughes .
4,521,913 6/1985 Huber et al. ............................ 455/121
4,578,739 3/1986 McGee et al. ....................... 455/348 X
4,658,439 4/1987 Danielsen et al. .................. 455/351 X
4,920,455 4/1990 Mair et al. .............................. 455/347
5,077,834 12/1991 Andros et al. ....................... 455/193.1
5,136,719 8/1992 Gaskill et al. ....................... 455/193.1

FOREIGN PATENT DOCUMENTS

WO-A
8904024 5/1989 WIPO .

*Primary Examiner*—Edward F. Urban
*Attorney, Agent, or Firm*—Sughrue, Mion, Zinn, Macpeak & Seas, PLLC

[57] ABSTRACT

A radio pager capable of changing the reception frequency thereof, as desired, and having a replaceable crystal oscillator. A reception frequency selecting device selects one of call signals having a plurality of predetermined frequencies which matches the crystal oscillator. A casing is formed with a first opening for allowing the crystal oscillator to be selectively attached to or detached from a printed circuit board, and a second opening for allowing the oscillator to be selectively inserted into or pulled out of the casing.

13 Claims, 4 Drawing Sheets

RADIO PAGER HOUSING HAVING OPENINGS FOR REPLACING A CRYSTAL OSCILLATOR

This is a Continuation of Application Ser. No. 07/836, 839 filed Feb. 19, 1992, now abandoned.

BACKGROUND OF THE INVENTION

The present invention relates to a radio pager capable of changing the reception frequency thereof, as desired, and, more particularly, to a radio pager having a casing which allows a crystal oscillator to be replaced with ease.

Generally, when call signals are transmitted by a plurality of frequencies, a radio pager has to change the reception frequency thereof in matching relation to the frequency of the call signal. With a radio pager having a local oscillation circuit implemented by a crystal oscillator, it has been customary to change the reception frequency by replacing the crystal oscillator and adjusting a plurality of tuning circuits including an antenna tuning circuit. Specifically, the tuning frequency of the tuning circuit has to be changed in conformity to the frequency of the call signal. However, the adjustment of the tuning frequency needs expert techniques and a jig for effecting the adjustment and, therefore, cannot be easily entrusted to a service company in charge of the paging system, as distinguished from a manufacturer. On the other hand, in the case of a radio pager having a synthesizer type local oscillation circuit, changing the reception frequency results in a decrease in the life of a battery since such a local oscillation circuit consumes far greater current than the local oscillation circuit implemented by a crystal oscillator.

Further, a current trend is toward a radio pager having a small and thin configuration and, in addition, having a casing which is mechanically strong. It is necessary, therefore, to assemble the casing by use of a number of screws or similar fastening means. As a result, designing a casing allowing a printed circuit board to be readily removed therefrom or a casing having a socket for replaceable part is extremely difficult to design. Therefore, to replace the crystal oscillator, the printed circuit board has to be removed from the casing by a number of troublesome steps.

SUMMARY OF THE INVENTION

It is, therefore, an object of the present invention to provide a radio pager capable of changing the reception frequency without aggravating current consumption.

It is another object of the present invention to provide a radio pager having a casing which promotes the ease of replacement of a crystal oscillator.

In accordance with the present invention, a radio pager capable of changing a reception frequency thereof has a receiving section for receiving a call signal having a predetermined frequency and including a modulated identification code, a demodulator for demodulating the call signal to reproduce the identification code, a memory storing an identification code assigned to the radio pager and reception frequency information, a comparing section for comparing the identification code demodulated by the demodulator with the identification code stored in the memory, and an alerting section for alerting a user of the radio pager to a call if the identification codes are identical as determined by the comparing section. The receiving section has a reception frequency selecting device for selectively receiving one of call signals having a plurality of predetermined frequencies.

Also, in accordance with the present invention, a radio pager capable of changing a reception frequency thereof has a printed circuit board on which a crystal oscillator constituting a local oscillator is mounted, and a casing for accommodating the printed circuit board and formed with a first opening for allowing the crystal oscillator and printed circuit board to be selectively connected or disconnected, and a second opening for allowing the crystal oscillator to be selectively inserted into or pulled out from the casing.

BRIEF DESCRIPTION OF THE DRAWINGS

The above and other objects, features and advantages or the present invention will become more apparent from the following detailed description taken with the accompanying drawings in which.

DESCRIPTION OF THE PREFERRED EMBODIMENT

Figure 1:
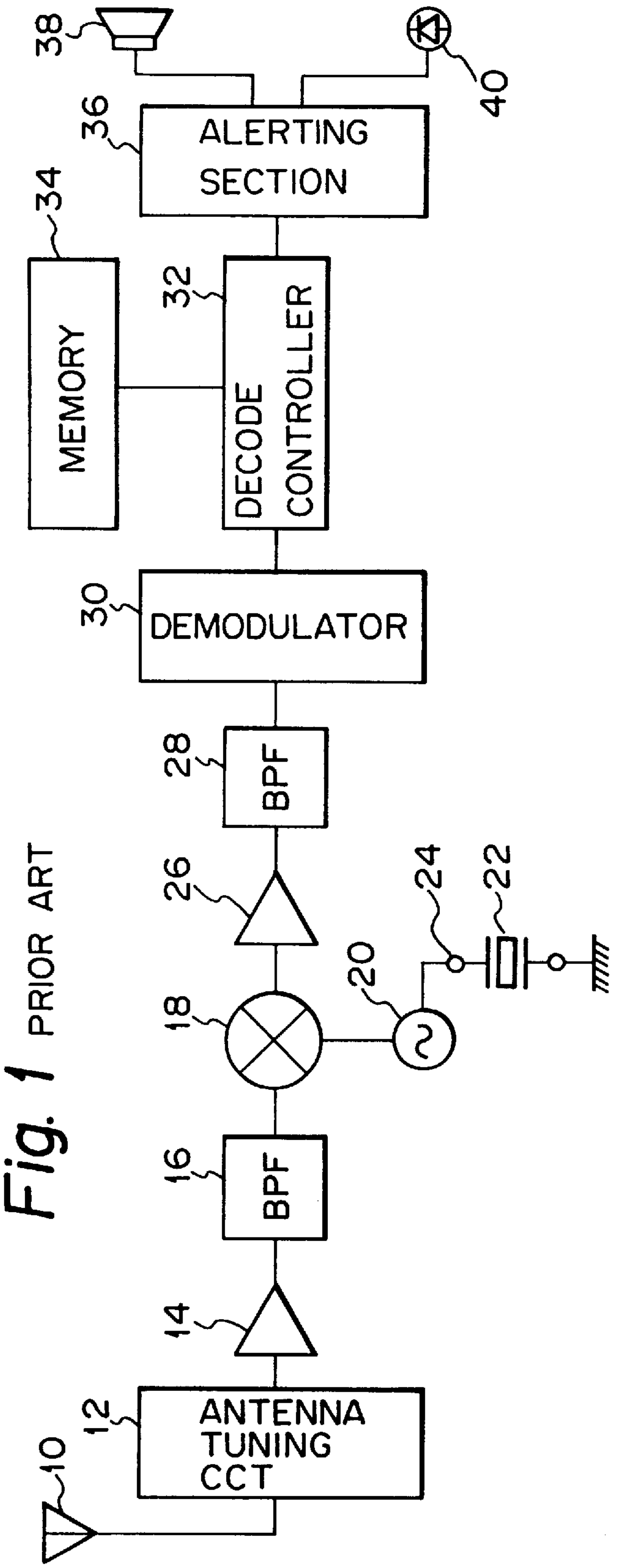
Fig. 1 PRIOR ART
FIG. 1 is a block diagram schematically showing an electrical arrangement of a conventional radio pager.

To better understand the present invention, a brief reference will be made to a conventional radio pager, shown in FIG. 1. The conventional pager is of the type allowing one to change the reception frequency by replacing a crystal oscillator included in a local oscillation circuit and adjusting a plurality of tuning circuits including an antenna tuning circuit. As shown, the pager has an antenna tuning circuit 12 between an antenna 10 and an RF (Radio Frequency) amplifier 14. The antenna tuning circuit 12 is so constructed as to minimize the transmission loss at a desired reception frequency. An RF amplifier 14 delivers an output thereof to a bandpass filter (BSPF) 16. The output of the BPF 16 is applied to one input terminal of a mixer 18. Applied to the other input terminal of the mixer 18 is a local oscillation signal from a local oscillation circuit 20. The mixer 18 combines the two inputs to produce a desired IF (Intermediate Frequency) signal. A crystal oscillator 22 is connected to the local oscillation circuit 20 via a socket 24 and is replaceable for implementing a desired reception frequency. The IF signal from the mixer 18 is fed to an IF amplifier 26 to be amplified thereby. The resulting output or the IF amplifier 26 is routed through a BPF 28 to a demodulator 30. In response, the demodulator 30 demodulates the data signal having been modulated and delivers the demodulated data signal to a decode controller 32. A memory 34 stores an address assigned to the radio pager and is connected to the decode controller 32. If an address included in the data signal from the demodulator 30 is identical with the address stored in the memory 34, the decode controller 32 feeds an alert control signal to an alerting section 36. In response, the alerting section 36 drives a loudspeaker 38 or a light emitting diode (LED) 40 to alert the user of the pager to the call. The memory 34 stores, in addition to the address, information designating either of the loudspeaker 38 and LED 40.

The conventional pager having the above construction has to have the tuning frequency of the tuning circuit 12 changed in conformity to the frequency of a call signal. This is not practicable without resorting to expert techniques and a jig for adjustment and, therefore, cannot be easily entrusted to a service company in charge of the paging system as distinguished from a manufacturer, as discussed earlier.

Figure 2:
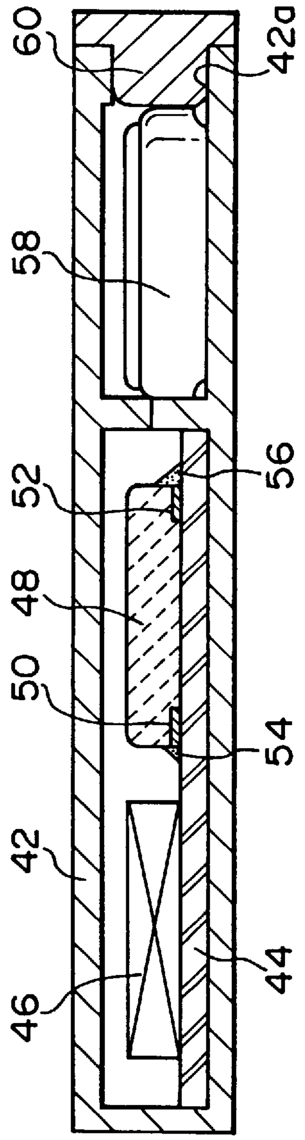
Fig. 2 PRIOR ART
FIG. 2 is a vertical section showing a specific construction of a casing included in the pager of FIG. 1.

FIG. 2 shows a specific configuration of the casing of a conventional radio pager. As shown, the casing 42 accommodates a printed circuit board 44 on which circuit part 46 and a crystal oscillator 48 are mounted. The crystal oscillator 48 is affixed to the printed circuit board 44 by having the terminal electrodes 50 and 52 thereof soldered, as at 54 and 56, to wirings provided on the circuit board 44. Since the pager shown in FIG. 2 is relatively thin, it is powered by a coin type battery 58 which is removable through an opening 42*a* formed in the casing 42. Usually, the opening 42*a* is closed by a lid 60. The problem with such a casing structure is that one cannot change the reception frequency, i.e., crystal oscillator 48 without removing the whole printed circuit board 44 from the casing 42 and then replacing the crystal oscillator 48. A casing which allows the printed circuit board 44 to be easily removed from the casing 42 or a casing having the socket 24, FIG. 1, is difficult to design, as also stated previously. It is, therefore, necessary to perform a substantial number of steps in the event of replacing the crystal oscillator 48.

Figure 3:
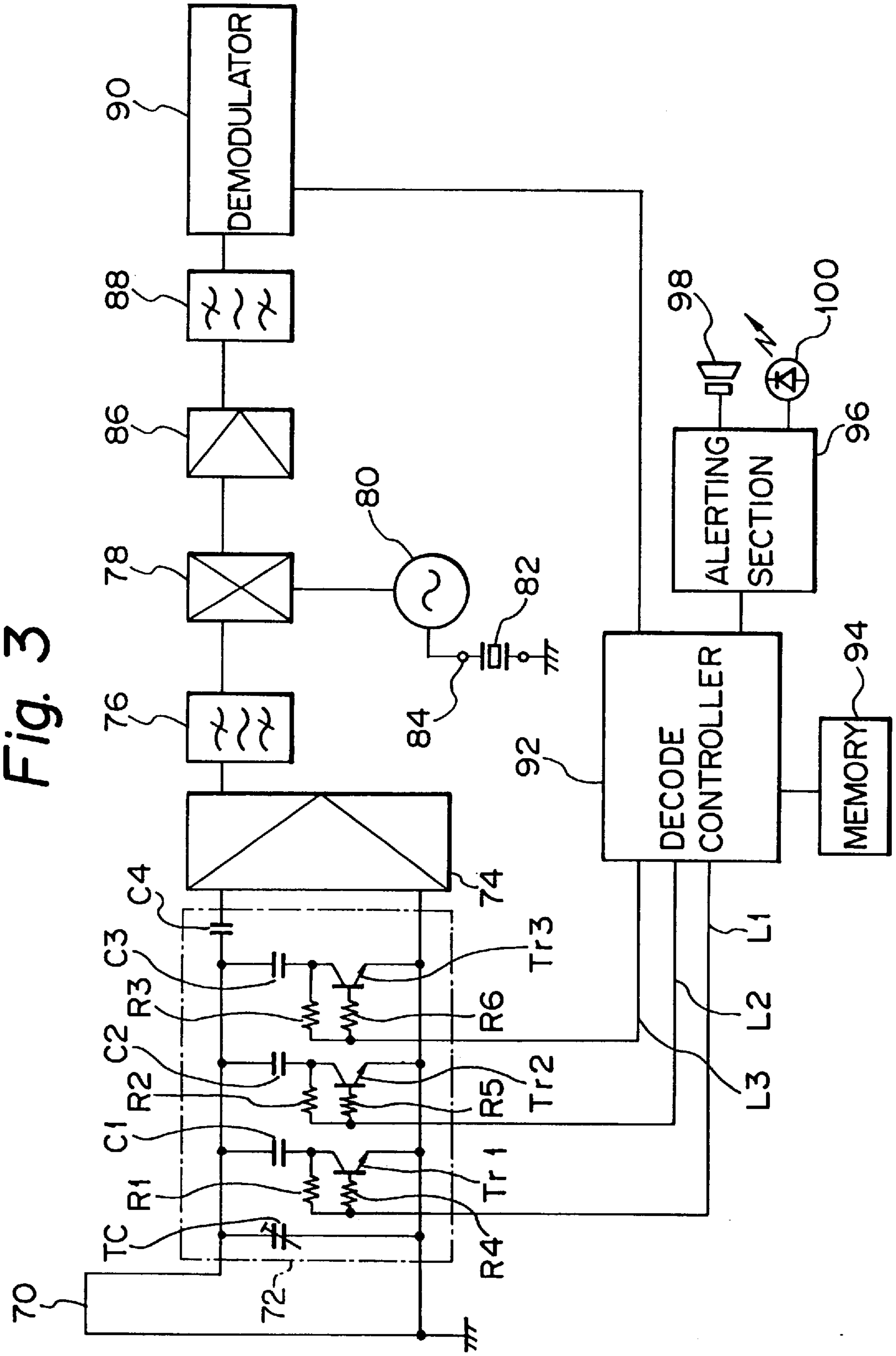
FIG. 3 is a block diagram schematically showing an electrical arrangement of a radio pager embodying the present invention.

Referring to FIG. 3, a radio pager embodying the present invention is shown and has an antenna tuning circuit 72 between an antenna 70 and an RF amplifier 74. The tuning circuit 72 is made up of a trimmer capacitor TC, capacitors $C_1$–$C_4$, transistors $Tr_1$–$Tr_3$, and resistors $R_1$–$R_6$ and constructed to minimize the transmission loss at a desired reception frequency. The resistors $R_1$–$R_6$ play the role of bias resistors for applying a voltage which the transistors $Tr_1$–$Tr_3$ need for switching operations. An RF amplifier 74 delivers an output thereof to a BPF 76. The BPF 76 is implemented as a SAW filter and limits the frequency band of about ±3 to ±5 megahertz of reception frequency. The output of the BPF 76 is applied to one input terminal of a mixer 78. The mixer 78 receives a local oscillation signal from a local oscillation circuit 80 at the other input terminal thereof. A crystal oscillator 82 is connected to the local oscillation circuit 80 via a socket 84 and is replaceable to implement a desired reception frequency.

An IF signal from the mixer 78 is fed to an IF amplifier 86. The amplified IF signal from the IF amplifier 86 is routed through a BPF 88 to a demodulator 90. In response, the demodulator 90 demodulates the data signal having been modulated and delivers the resulting data signal to a decode controller 92. A memory 94 is connected to the decode controller 92 and stores an address assigned to the pager. If an address included in the data signal from the demodulator 90 is identical with the address stored in the memory 94, the decode controller 92 feeds an alert control signal to an alerting section 96. On receiving the alert control signal, the alerting section 96 drives a loudspeaker 98 or an LED 100 to alert the user to the call. The memory 94 stores, in addition to the address assigned to the pager, information designating either of the loudspeaker 98 and LED 100 and information representative of reception frequencies. Control signal lines $L_1$–$L_3$ extend from the decode controller 92 to the bases of the transistors $Tr_1$–$Tr_3$, respectively. At least when a power switch, not shown, provided on the pager is turned on, the decode controller 92 reads the reception frequency information out of the memory 94 and changes the logical level of one of the control signal lines $L_1$–$L_3$ matching the reception frequency to a high level.

Figure 4:
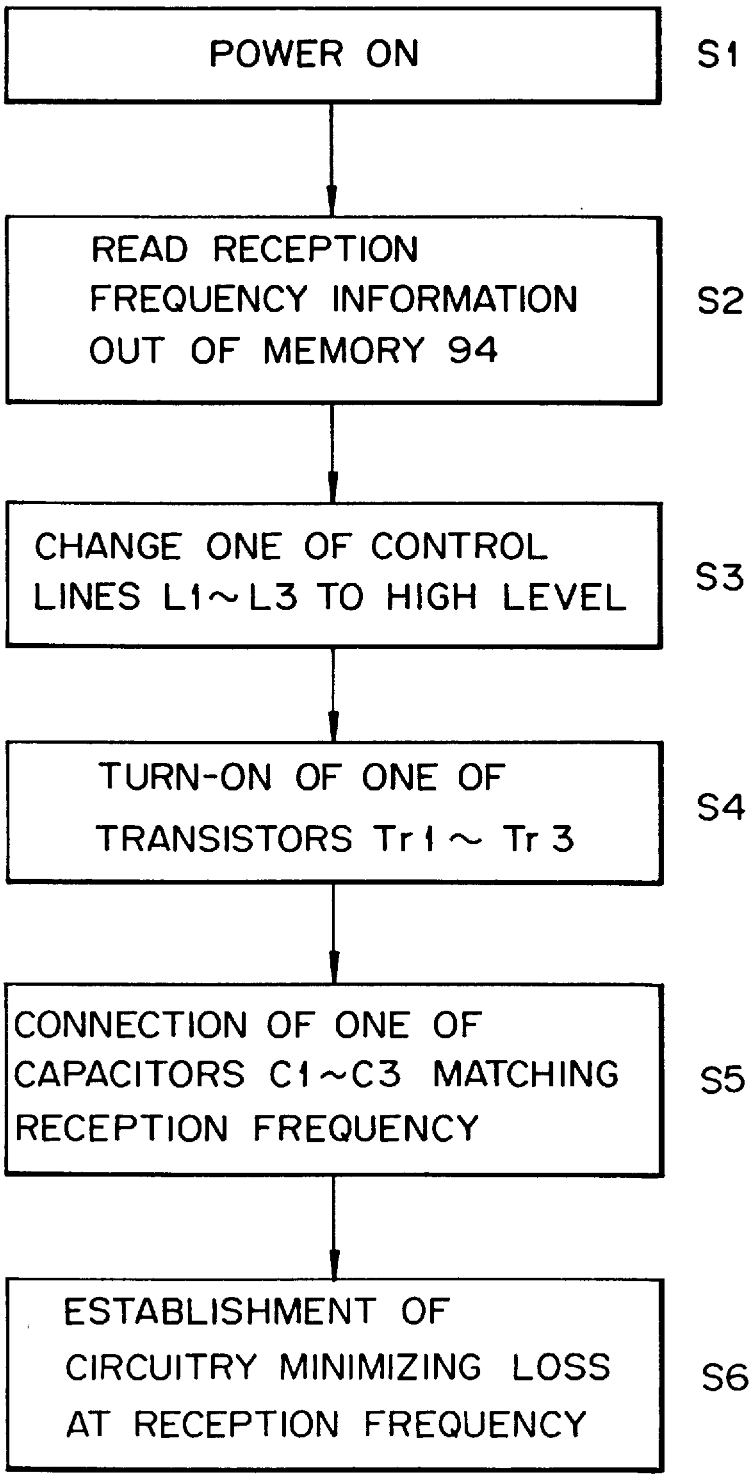
FIG. 4 is a flowchart demonstrating a specific operation of the embodiment.

A specific operation of the embodiment will be described with reference to FIG. 4. The reception frequency information is written to the memory 94 beforehand by a service company in charge of the paging system. In FIG. 4, as the power switch of the pager is turned on (step S1), the decode controller 92 reads the reception frequency information out of the memory 94 (S2) and then changes the logical level of one of the control signal lines $L_1$–$L_3$ matching the information to a high level (S3). As a result, one or the transistors $Tr_1$–$Tr_3$ connected to the high level control line is rendered conductive (S4). Therefore, one of the capacitors $C_1$–$C_3$ connected to the transistor having been turned on is connected in parallel to the trimmer capacitor TC (S5). In such an arrangement, only if the capacitors $C_1$–$C_3$ are each provided with a particular capacitance which minimizes the transmission loss at a particular reception frequency band (S6), the reception frequency can be readily changed without resorting to any fine adjustment.

If desired, the decode controller 92 may be so constructed as to read the information out of the memory 94 periodically since the information is susceptible to static electricity and other similar disturbances.

Figure 5:
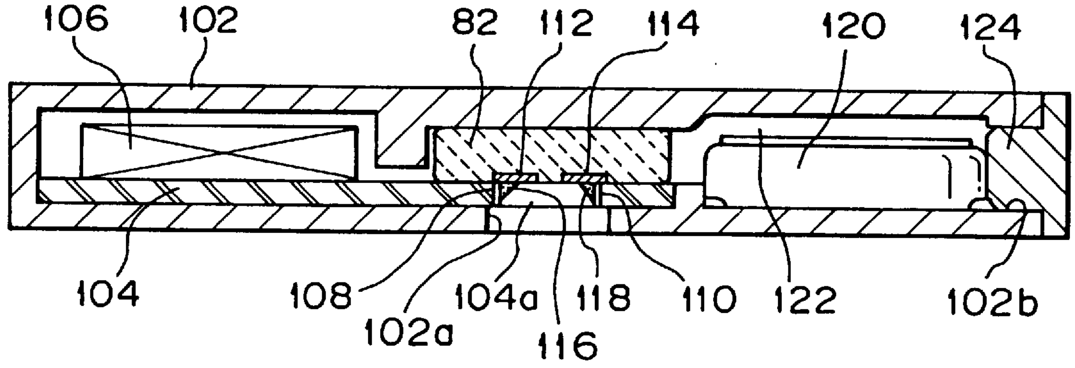
FIG. 5 is a vertical section of a casing included in the embodiment.
Figure 6:
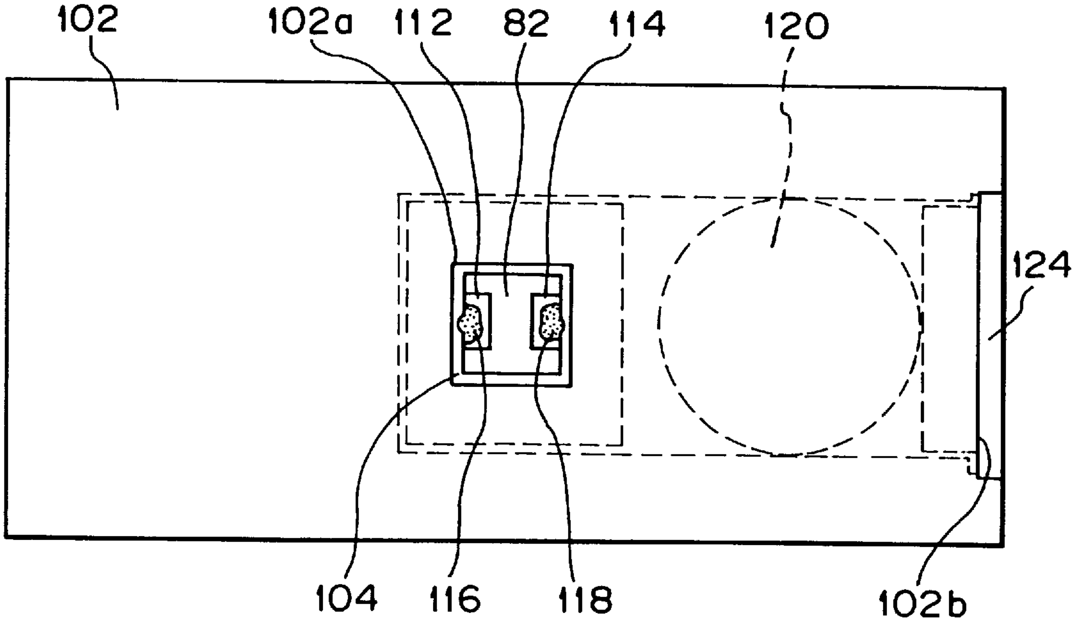
FIG. 6 is a bottom view of the casing shown in FIG. 5.

FIGS. 5 and 6 show a specific structure of a casing which accommodate the circuitry described above with reference to FIG. 3. As shown, the casing 102 accommodates a printed circuit board 104 therein on which the crystal oscillator 82 and circuit part 106 are mounted. The crystal oscillator 82 is affixed to and electrically connected to the printed circuit board 104. Specifically, terminal electrodes 112 and 114 provided on the side of the crystal oscillator 82 facing the circuit board 104 are soldered, as at 116 and 118, to terminals 108 and 110 of the circuit board 104 which are implemented as through holes. The circuit board 104 is affixed to the inner periphery of the casing 102. The casing 102 is formed with a first opening 102*a* in alignment with opening 104*a* formed in the circuit board 104. To attach or detach the crystal oscillator 82, a soldering iron may be inserted into the casing 102. In the illustrative embodiment, a coin type battery 120 is inserted into or removed from a battery chamber 122 formed in the casing 102 through a second opening 102*b* also formed in the casing 102. A lid 124 usually closes the second opening 102*b*. The printed circuit board 104 partly extends into the battery chamber 122. The crystal oscillator 82 is mounted on the part of the circuit board 104 which is located in the battery chamber 122. Therefore, the crystal oscillator 82 can be inserted into or removed from the casing 102 by way of the battery chamber 122 and second opening 102*b*.

The crystal oscillator 82 is replaced with another to change the reception frequency of the pager, as follows. First, a soldering iron is inserted into the casing 102 through the first opening 102*a* to melt the solder 116 and 118 to thereby disconnect the crystal oscillator 82 from the printed circuit board 104. Then, the lid 124 is removed to pull out the battery 120 from the casing 102 via the second opening 102*b*. Thereafter, the crystal oscillator 82 having been disconnected from the circuit board 104 is removed from the casing 102. Subsequently, a substitute crystal oscillator 82 and the battery 120 are sequentially inserted into the battery chamber 122 in this order through the second opening 102*b*. After the opening 102*b* has been closed by the lid 124, a soldering iron is again inserted into the casing 102 through the first opening 102*a* to melt the solder 116 and 118. As a result, the substitute crystal oscillator 82 is electrically connected to the circuit board 104. A logotype label, for example, may be adhered to the outer periphery of the casing 102 around the first opening 102*a* to close it except when replacement is needed.

In summary, it will be seen that the present invention provides a radio pager having a simple design and capable of readily changing the reception frequency thereof without aggravating current consumption.

Various modifications will become possible for those skilled in the art after receiving the teachings of the present disclosure without departing from the scope thereof.

What is claimed is:

1. A radio pager comprising:

a receiving section for receiving a call signal having a predetermined frequency and including a modulated identification code, said receiving section comprising reception frequency selecting means for selectively receiving one of call signals having a plurality of predetermined frequencies, said reception frequency selecting means comprising a local oscillation circuit driven by a replaceable crystal oscillator;

a demodulator section for demodulating said call signal to reproduce said identification code;

a memory section storing an identification code assigned to said radio pager;

a comparing section for comparing said identification code demodulated by said demodulator section with said identification code stored in said memory section;

an alerting section for alerting a user of said pager to a call if said identification codes are identical as determined by said comparing section; and a casing accommodating a printed circuit board for mounting said crystal oscillator, said casing comprising a first opening for selectively connecting or disconnecting said crystal oscillator from said printed circuit board without removing said circuit board from said casing and a second opening for allowing said crystal oscillator to be selectively inserted into or pulled out of said casing without removing said circuit board from said casing.

2. A radio pager as claimed in claim 1, wherein said second opening also allows a battery to be selectively inserted into or pulled out from said casing.

3. A radio pager as claimed in claim 1, wherein said memory section further stores reception frequency information.

4. A radio pager as claimed in claim 3, wherein said reception selecting means further comprises an antenna, an antenna tuning circuit capable of changing a tuning frequency in conformity to the reception frequency and a tuning frequency control circuit to control said antenna tuning circuit to change the tuning frequency in conformity to said crystal oscillator frequency and said reception frequency information.

5. The radio pager as set forth in claim 1, wherein said first opening is formed in a first surface of said casing, said first surface of said casing facing said crystal oscillator mounted on said printed circuit board.

6. A radio pager comprising:

a receiving section for receiving a call signal having a predetermined frequency and including a modulated identification code, said receiving section comprising reception frequency selecting means for selectively receiving one of call signals having a plurality of predetermined frequencies, said reception frequency selecting means comprising a local oscillation circuit driven by a replaceable crystal oscillator;

a demodulator section for demodulating said call signal to reproduce said identification code;

a memory section storing an identification code assigned to said radio pager;

a comparing section for comparing said identification code demodulated by said demodulator section with said identification code stored in said memory section;

an alerting section for alerting a user of said pager to a call if said identification codes are identical as determined by said comparing section; and a casing accommodating a printed circuit board for mounting said crystal oscillator, said casing comprising a first opening for selectively connecting or disconnecting said crystal oscillator from said printed circuit board without removing said circuit board from said casing and a second opening for allowing said crystal oscillator to be selectively inserted into or pulled out of said casing without removing said circuit board from said casing, wherein said first opening is located to face terminal electrodes of said crystal oscillator which are soldered to said printed circuit board, allowing a soldering iron to be inserted into said casing as far as said terminal electrodes.

7. A radio pager comprising:

a receiving section for receiving a call signal having a predetermined frequency and including a modulated identification code, said receiving section comprising reception frequency selecting means for selectively receiving one of call signals having a plurality of predetermined frequencies, said reception frequency selecting means comprising a local oscillation circuit driven by a replaceable crystal oscillator;

means for comparing the modulated identification code with a predetermined identification code;

means for alerting a user when the modulated identification code and the predetermined identification code are the same;

a casing accommodating a printed circuit board for mounting said crystal oscillator, said casing comprising a first opening for selectively connecting or disconnecting said crystal oscillator from said printed circuit board without removing said circuit board from said casing and a second opening for allowing said crystal oscillator to be selectively inserted into or removed from said casing without removing said circuit board from said casing.

8. A radio pager as set forth in claim 7, wherein said reception frequency selecting means further comprises:

a memory for storing reception frequency information relating to said replaceable crystal oscillator;

an antenna tuning circuit; and a tuning frequency control circuit for controlling said antenna tuning circuit to change a tuning frequency thereof according to said reception frequency information.

9. A radio pager as set forth in claim 8, wherein said antenna tuning circuit comprises:

a trimming capacitor;

a plurality of tuning capacitors;

a plurality of transistors, each of said plurality of transistors corresponding to one of said plurality of tuning capacitors; and wherein said tuning frequency control circuit generates a control signal according to said reception frequency information, said control signal causing one of said transistors to connect the tuning capacitor which corresponds to said one of said transistors in parallel with said trimmer capacitor, thereby changing the tuning frequency of the antenna tuning circuit.

10. A radio pager comprising:

a receiving section for receiving a call signal having a predetermined frequency and including a modulated identification code, said receiving section comprising reception frequency selecting means for selectively receiving one of call signals having a plurality of predetermined frequencies, said reception frequency selecting means comprising a local oscillation circuit driven by a replaceable crystal oscillator;

a demodulator section for demodulating said call signal to reproduce said identification code;

a memory section storing an identification code assigned to said radio pager;

a comparing section for comparing said identification code demodulated by said demodulator section with said identification code stored in said memory section;

an alerting section for alerting a user of said pager to a call if said identification codes are identical as determined by said comparing section; and a casing accommodating a printed circuit board for mounting said crystal oscillator, said casing comprising a first opening for selectively connecting or disconnecting said crystal oscillator from said printed circuit board without removing said circuit board from said casing and a second opening for allowing said crystal oscillator to be selectively inserted into or pulled out of said casing without removing said circuit board from said casing, wherein said first opening is formed in a first surface of said casing, said first surface of said casing facing said crystal oscillator mounted on said printed circuit board, and wherein said second opening is formed in a second surface of said casing, said second surface of said casing not facing said printed circuit board.

11. A radio pager which selectively receives signals using a crystal oscillator, said radio pager comprising:

a casing accommodating a printed circuit board for mounting said crystal oscillator;

a first opening formed in the casing for selectively connecting or disconnecting the crystal oscillator from said printed circuit board without removing said circuit board from said casing; and a second opening formed in the casing for allowing the crystal oscillator to be selectively inserted into or pulled out of the casing without removing said circuit board from said casing.

12. A radio pager as set forth in claim 11, wherein said first opening is formed so as to allow a battery to be inserted and pulled out of the casing.

13. A radio pager as set forth in claim 11, further comprising a printed circuit board for mounting said crystal oscillator and wherein said second opening is formed so as to allow said crystal oscillator to be connected and disconnected from said printed circuit board by soldering therethrough.

* * * * *